US012777415B2

(12) United States Patent
Cui et al.

(10) Patent No.: US 12,777,415 B2
(45) Date of Patent: Oct. 27, 2026

(54) PACKET SWITCHING METHOD IN ENERGY SAVING MODE

(71) Applicant: Chongqing University of Posts & Telecommunications, Chongqing (CN)

(72) Inventors: Yaping Cui, Chongqing (CN); Dapeng Wu, Chongqing (CN); Peng He, Chongqing (CN); Ruyan Wang, Chongqing (CN); Hong Zhang, Chongqing (CN); Kang Wang, Chongqing (CN)

(73) Assignee: Chongqing University of Posts & Telecommunications, Chongqing (CN)

( * ) Notice: Subject to any disclaimer, the term of this patent is extended or adjusted under 35 U.S.C. 154(b) by 0 days.

(21) Appl. No.: 18/848,896

(22) PCT Filed: Oct. 12, 2023

(86) PCT No.: PCT/CN2023/124178
§ 371 (c)(1),
(2) Date: Sep. 19, 2024

(87) PCT Pub. No.: WO2025/020306
PCT Pub. Date: Jan. 30, 2025

(65) Prior Publication Data

US 2026/0113703 A1 Apr. 23, 2026

(30) Foreign Application Priority Data

Jul. 24, 2023 (CN) ......................... 202310916431.1

(51) Int. Cl.
*H04W 52/02* (2009.01)

(52) U.S. Cl.
CPC ............................... *H04W 52/0206* (2013.01)

(58) Field of Classification Search
CPC ..... H04L 67/306; H04L 63/08; H04L 5/0064; H04L 63/065; H04L 67/1044;
(Continued)

(56) References Cited

U.S. PATENT DOCUMENTS 7,321,780 B2 * 1/2008 Love ..................... H04L 1/0002 455/442
9,137,759 B1 * 9/2015 Vargantwar ......... H04W 52/267
(Continued)

FOREIGN PATENT DOCUMENTS

CN 101562479 A 10/2009
CN 101951664 A 1/2011
(Continued)

OTHER PUBLICATIONS

Yuqun Zhou, et al, An Improved Robust Fuzzy Twin Support Vector Machine Algorithm, Computer Engineering and Application, vol. 59(1), Jan. 31, 2023, 140-148.
(Continued)

*Primary Examiner* — Khalid W Shaheed

(57) ABSTRACT

The present invention relates to a group switching method under energy saving modes and belongs to the technical field of communications. By dynamically managing the access and switchover of users through the grouping method, the existing users are provided with services of sufficient quality and quantity, and the switching efficiency is improved so that the cells are prevented from overloading and wasting resources. The proposed group switching method is mainly to group switch users and energy saving compensation cells according to the business types of users and dynamically divide user groups and access the user groups according to resources required by the users and the relationship of sizes of resources provided by the compensation cells. The
(Continued)

method fully guarantees the business needs of users and improves the utilization rate of cell resources.

2 Claims, 2 Drawing Sheets

(58) Field of Classification Search
CPC ........ H04L 67/566; H04B 2201/70703; H04B 7/0426; H04M 15/765; H04W 4/08; H04W 72/121; H04W 36/0009; H04W 12/76; H04W 36/165; H04W 52/30; H04W 28/0221
See application file for complete search history.

(56) References Cited

U.S. PATENT DOCUMENTS

2005/0136961 A1* 6/2005 Simonsson ......... H04W 52/265 455/522
2006/0256747 A1* 11/2006 Jaakkola ............... H04L 1/0002 370/328
2014/0295859 A1* 10/2014 Shin ...................... H04W 72/51 455/450

FOREIGN PATENT DOCUMENTS

| | | | |
|---|---|---|---|
| CN | 108337702 | A | 7/2018 |
| CN | 115978466 | A | 4/2023 |
| CN | 116782351 | A | 9/2023 |
| WO | WO2015012584 | A1 | 1/2015 |

OTHER PUBLICATIONS

Office action of corresponding CN application 202310446838.2, published on Nov. 29, 2024.
Notice of Grant of Patent Right of corresponding CN application 202310446838.2, published on Mar. 7, 2025.
International Search Report of corresponding PCT/CN2023/124178, published on Apr. 13, 2024.
Written Opinion of corresponding PCT/CN2023/124178, published on Apr. 13, 2024.

* cited by examiner

PACKET SWITCHING METHOD IN ENERGY SAVING MODE

FIELD OF INVENTION

The present invention belongs to the technical field of communications and relates to a group switching method under energy saving modes.

BACKGROUND ART OF THE INVENTION

An energy saving technical system of wireless networks is mainly divided into three technical fields: device-level, site-level and network-level. For device-level energy saving, new materials and new technologies are mainly used to reduce the energy consumption of devices. For site-level energy saving, radio frequency hardware resources that are not in use are disabled mainly according to the network load, so as to achieve the effect of saving power and resources. For network-level energy saving, multi-cell collaboration is mainly adopted, and shutdown and wake-up of cells are realized according to the current network configuration, performance requirements, user parameters and other information through algorithms. The present invention mainly reduces the consumption of system resources at the network level.

In the mobile communication network, energy saving is achieved by means of switching base stations. The base stations can actively detect network conditions to trigger energy saving operation, or the working state of each base station can be passively managed through a centralized resource manager (CRM), and finally, the working state of each base station is announced through an interface. The wake-up of the base stations can be triggered by themselves, or a neighbor base station can send a request to a dormant base station to wake it up to share the high load on the network. The processes designed for distributed and centralized energy saving management are similar, and at the initialization stage of energy saving operation, all the base stations periodically broadcast the configuration information of the cells and the relevant useful information such as load, user information and base station power distribution to neighbor base stations. The execution of energy saving algorithms is triggered according to the information, and the decision on working state transition of the cells is made. Finally, the result of the decision is executed, and each base station enters the corresponding working state.

The global cell state detection based on real-time information interaction requires periodic interaction of useful information between network nodes. Once it is found that the load of the cells is lower than the set threshold and it is found through information interaction that neighbor cells do not achieve load saturation, the users of the cells can be accommodated so that the eNB of the cells can enter an energy saving state and the users are switched to neighbor base stations. When the load of the neighbor base stations is increased, signaling is sent to wake up cells that are in the energy saving state to reduce load pressure. The trigger of energy saving is jointly determined by the internal information of the cells and the interaction information of the neighbor cells. The whole signaling interaction comprises three stages: conducting information interaction at the initialization stage; sending a shutdown notification and a wake-up request once energy saving conditions are met; and confirming and executing upon receipt of the notification. The global cell state detection based on real-time information interaction can make full use of every energy saving opportunity and consider the QoS of users, the time for performing starting and wake-up is accurate, but frequent signaling interaction is required, which increases the complexity of the system.

The present invention provides a group switching method under energy saving modes. Firstly, whether power resources required by switch users in energy saving cells are less than idle power resources of energy saving compensation cells is judged, so as to determine whether to adopt energy saving operation for all the cells. Then, the user types in each compensation cell are determined to select accessed user types. Finally, compensation cells are selected accordingly for switching operation based on the business types of the users.

Disclosure of the Invention

In view of this, the purpose of the present invention is to provide a group switching method under energy saving modes. The switching of a cell from the normal mode to energy saving modes or between different energy saving modes will make users randomly switched to other adjacent energy saving compensation cells, which may cause that business requirements of all the users cannot be met. In order to provide the existing users with services of sufficient quality and quantity under energy saving compensation modes of the cells and improve the switching efficiency, the users can be grouped in the energy saving cells according to the user information. However, some problems may be caused, for example, grouping based on what information about the users, the number of users that can be loaded in different energy saving modes, and proportions of different types of users in the energy saving cells. In view of the above problems, the present invention provides a user grouping method according to different energy saving modes of cells and dynamically manages the access and switchover of users through the grouping method so that the cells are prevented from overloading and wasting resources.

To achieve the above purpose, the present invention provides the following technical solution:

A group switching method under energy saving modes, comprising two stages of user grouping and group switching:

The preparation of user grouping is as follows:

A mobile communication system defines four business types of users: a session type, a stream type, an interaction type and a background type; and users are distinguished according to different business types, and four types of users are divided;

The users are divided into two categories and specifically divided into three user groups according to requirements for the transmission rate; firstly, switch users of the session type and the stream type have certain requirements for the transmission rate, so the switch users of the two types are incorporated into the same category, which is named a category with high requirements for the transmission rate; the interaction type and the background type are incorporated into the other category, which is named a category with low requirements for the transmission rate; then, ⅔ of switch users are randomly divided from the category with high requirements for the transmission rate to constitute a user group 1, ⅔ of switch users are randomly divided from the category with low requirements for the transmission rate to constitute a user group 2, and the remaining switch users constitute a user group 3; the user groups are accessed to energy saving compensation cells by the grouping method; the energy saving compensation cells are divided into two categories according to user types in the cells: high transmission rate cell and low transmission rate cell; the low transmission rate cell means that users of the interaction type and the background type in the energy saving compensation cells are more than users of the other two types, which is expressed as a cell 1; and the high transmission rate cell means that users of the session type and the stream type in the energy saving compensation cells are more than users of the other two types, which is expressed as a cell 2;

The group switching is as follows:

Power resources required by the switch users to support the own businesses in all energy saving cells are calculated through a CRM, and $P_N$ represents power resources required by the used users; moreover, idle power resources of all the energy saving cells are calculated through the CRM, that is, power resources that can be provided to the switch users; $P_C$ is used to represent the idle power resources in all the energy saving compensation cells; if the power resources $P_N$ required by the users are more than the idle resources $P_C$ f the energy saving compensation cells, not all the switch users can be accessed to the energy saving compensation cells; the number of the energy saving cells is reduced, that is to reduce the number of the switch users, until the power resources required by the switch users are less than the idle resources of the energy saving compensation cells, otherwise the number of the energy saving cells is gradually reduced; after the idle resources of the energy saving compensation cells are more than resources required by the switch users, the numbers of users of the user group 1 and the user group 2 are determined; and if the number of users of the user group 1 is greater than that of the user group 2, the access situation of the user group 1 is analyzed first, otherwise, the access situation of the user group 2 is analyzed first.

Optionally, if the number of users of the user group 1 is greater than that of the user group 2, whether power resources required by the user group 1 are less than idle power resources that can be provided by the cell 1 is judged; if the idle power resources that can be provided by the cell 1 are less than resources required by the user group 1, part of the users of the user group 1 are switched to the cell 1, and the remaining switch users that are not accessed are incorporated into the user group 3; all the switch users of the user group 3 and the user group 2 are accessed to the cell 2; if the idle power resources that can be provided by the cell 1 are more than the resources required by the user group 1, all the users of the user group 1 are switched to the cell 1; whether the cell 1 still has idle resources is judged, if yes, part of the users of the user group 2 are switched to the cell 1, and if not, the cell 1 can serve switch users of the user group 1 completely; and the remaining switch users are accessed to the cell 2;

If the number of users of the user group 2 is greater than that of the user group 1, whether power resources required by the user group 2 are less than idle power resources that can be provided by the cell 2 is judged; if the idle power resources that can be provided by the cell 2 are more than resources required by the user group 2, all the users of the user group 2 are switched to the cell 2; then, whether the cell 2 has the remaining idle power resources is judged, if yes, part of the switch users of the user group 1 are accessed to the cell 2, and if not, the cell 2 can serve switch users of the user group 2 completely; the remaining switch users of the user group 3 and the user group 1 are accessed to the cell 2; if the idle power resources that can be provided by the cell 2 are less than the resources required by the user group 2, part of the users of the user group 2 are switched to the cell 2, and the remaining switch users that are not accessed are incorporated into the user group 3; and all the switch users of the user group 3 and the user group 1 are accessed to the cell 1.

The present invention has the following beneficial effects:

Firstly, whether the power resources required by the users in the energy saving cells are less than the idle power resources that can be provided by the compensation cells is judged. Otherwise, the number of cells that need to save energy is reduced through the CRM, i.e., part of the cells that need to save energy receive users from other energy saving cells, so as to increase the number of users to exceed the energy saving threshold.

Then, the business types of original users and the proportions of users of different business types in the energy saving compensation cells are analyzed, and the user groups are divided according to different business types of the switch users.

Finally, the switchover of the users and the access of the cells are selected according to the user information provided by the CRM and the information of the energy saving compensation cells.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

DETAILED DESCRIPTION OF THE INVENTION

Figure 1:
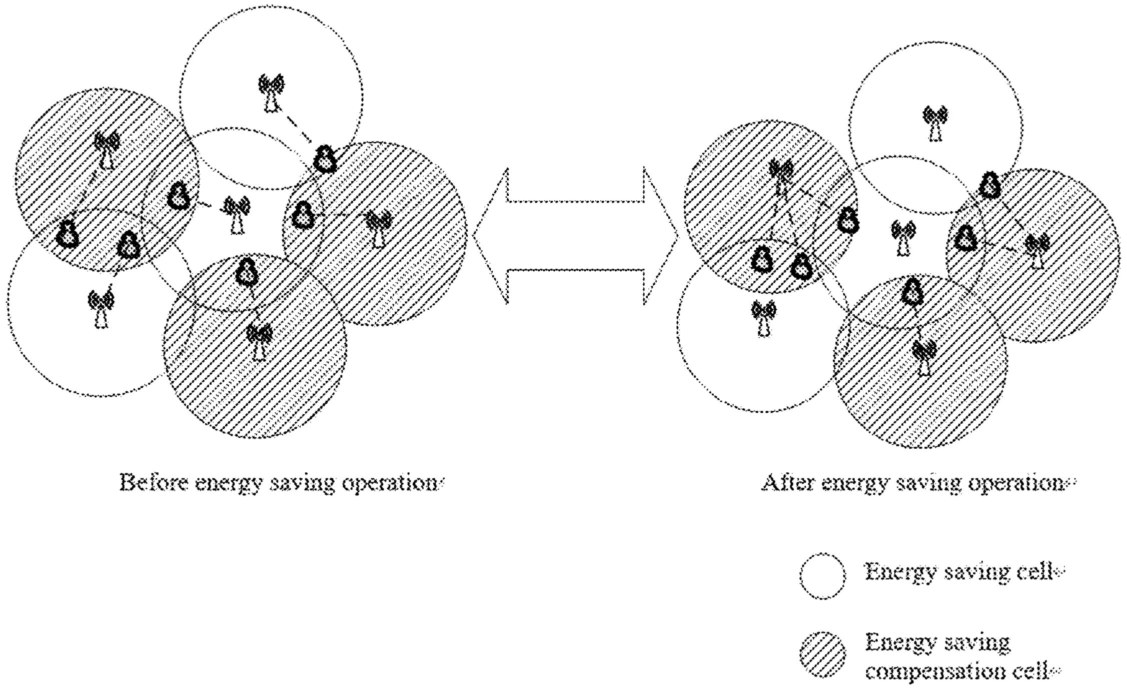
FIG. 1 shows an energy saving system of multi-cell collaboration.

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference numerals in the drawings of the embodiments of the present invention refer to same or similar components. It should be understood in the description of the present invention that terms such as “upper”, “lower”, “left”, “right”, “front” and “back” indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

The present invention designs a group switching method under energy saving modes to realize the rational utilization of system resources. The switching of a cell from the normal mode to energy saving modes or between different energy saving modes may cause that business requirements of all the users cannot be met, so part of the users are switched to other adjacent cells. Therefore, the users are grouped by the energy saving cells, so as to provide the existing users with services of sufficient quality and quantity under the energy saving modes of the system. The present invention considers the energy saving operation of multiple cells, as shown in FIG. 1. The present invention divides the energy saving compensation cells according to the proportions of users of different business types. Moreover, the users are grouped according to different business types. Users in different user groups have different business types and thus have different requirements for power resources of the cells. The different user groups are accessed to different energy saving compensation cells. The access and switchover of the users are dynamically managed through the grouping strategy so that the cells are prevented from overloading and wasting resources. The specific implementation process of the solution is divided into the following two stages:

Stage 1: Preparation of User Grouping

The cells change the network states thereof in the off-peak period to enter the low-power working mode. Base stations perform energy saving operation and change the working states thereof, and different energy saving states are defined as follows: a normal state means that the cellular network does not perform any energy saving operation and all devices are kept working normally at full power, without any energy consumption reduction; an energy saving state means that the cellular network adopts a certain energy saving mechanism to make part of or the whole network devices in a low-power state, where the working states of the network devices can be closed or dormant; and an energy saving compensation state means that in the process of implementing the energy saving mechanism, some network devices need to adjust the transmitting power on the basis of maintaining the normal working state to make up for the impact of other surrounding base stations entering the energy saving state. For example, in the cellular network structure, after a base station enters the energy saving state, one or more surrounding base stations need to expand the coverage area to make up for the coverage hole, and then the base stations with extended coverage enter the energy saving compensation state.

Figure 2:
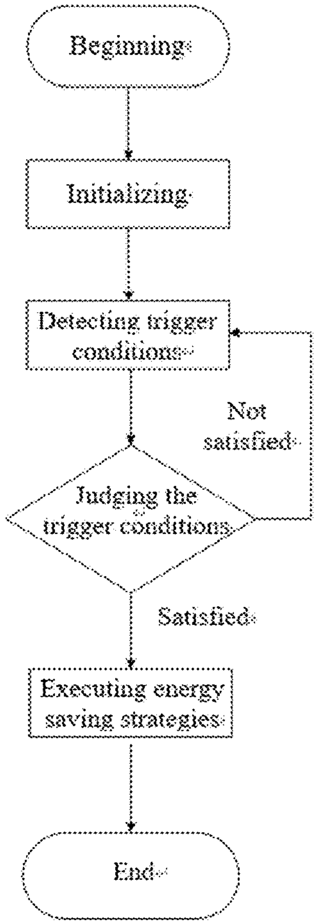
FIG. 2 is a flow chart of an energy saving mechanism of cells.

In the mobile communication network, energy saving is achieved by means of switching the base stations, the working state of each base station can be managed through the CRM, and finally, the working state of each base station is announced through an interface. The wake-up of the base stations can be triggered by themselves, or a neighbor base station can send a request to a dormant base station to wake it up to share the high load on the network. For centralized energy saving management, at the initialization stage of energy saving operation, all the base stations periodically broadcast the configuration information of the cells and the relevant useful information such as load, user information and base station power distribution to neighbor base stations. The execution of energy saving algorithms is triggered according to the information, and the decision on working state transition of the cells is made. Finally, the result of the decision is executed, and each base station enters the corresponding working state. The flow chart of the whole energy saving mechanism is shown in FIG. 2. In the flow chart, the trigger condition is global cell state detection based on real-time information interaction. The global cell state detection based on real-time information interaction requires periodic interaction of useful information between network nodes. Once it is found that the load of the cells is lower than the set threshold and it is found through information interaction that neighbor cells do not achieve load saturation, the users of the cells can be accommodated so that the eNB of the cells can enter an energy saving state and the users are switched to neighbor base stations. When the load of the neighbor base stations is increased, signaling is sent to wake up cells that are in the energy saving state to reduce load pressure. The trigger of energy saving is jointly determined by the internal information of the cells and the interaction information of the neighbor cells. The whole signaling interaction comprises three stages: conducting information interaction at the initialization stage; sending a shutdown notification and a wake-up request once energy saving conditions are met; and confirming and executing upon receipt of the notification. The global cell state detection based on real-time information interaction can make full use of every energy saving opportunity, and considering the QoS of users, starting and wake-up are performed.

A mobile communication system defines four business types of users: a session type, a stream type, an interaction type and a background type. The difference between the types mainly lies in the sensitivity to delay. The session type must maintain the time variation of information entities in the stream and has strict requirements for delay. Therefore, the session type has the highest business requirements and requires the network to provide a high data transmission rate; the data stream type must maintain the time relationship between the information entities in the stream and has certain requirements for delay; the interaction type belongs to businesses of the request-response mode and must maintain the integrity of data information; and the background type means that the information receiving end has no time limit on background business types and has the minimum requirements for the rate as long as the data integrity is maintained. Therefore, the users can be distinguished according to different business types, and four types of users are divided.

The users can be divided into two categories and specifically divided into three user groups according to requirements for the transmission rate. Firstly, switch users of the session type and the stream type have certain requirements for the transmission rate, so the switch users of the two types are incorporated into the same category, which is named a category with high requirements for the transmission rate for convenience of representation. Compared with the session type and the stream type, switch users of the interaction type and the background type have no strict requirements for the transmission rate and thus are grouped into the other category, which is named a category with low requirements for the transmission rate. Then, ⅔ of switch users are randomly divided from the category with high requirements for the transmission rate to constitute a user group 1, ⅔ of switch users are randomly divided from the category with low requirements for the transmission rate to constitute a user group 2, and the remaining switch users constitute a user group 3. The user groups are accessed to energy saving compensation cells by the grouping method. Similarly, the energy saving compensation cells can also be divided into two categories according to user types in the cells: high transmission rate cell and low transmission rate cell. The low transmission rate cell means that the users of the interaction type and the background type in the energy saving compensation cells are more than users of the other two types, which can also be expressed as a cell 1. The high transmission rate cell means that the users of the session type and the stream type in the energy saving compensation cells are more than users of the other two types, which can also be expressed as a cell 2.

Stage 2: Group Switching

Figure 3:
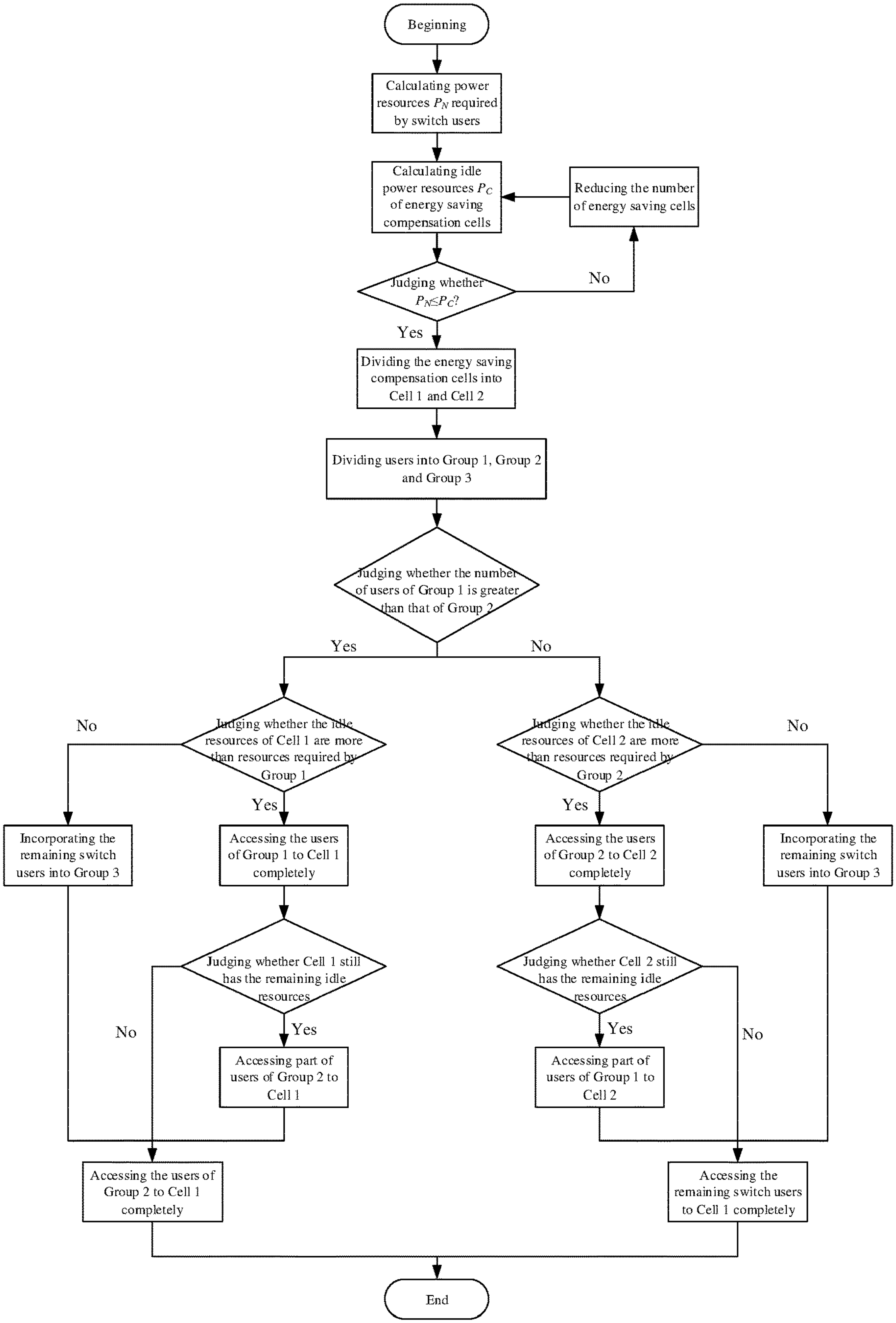
FIG. 3 is a flow chart of a group switching method.

At stage 2, the group switching of the users is mainly completed, with the main process shown in FIG. 3. Firstly, power resources required by the switch users to support the own businesses in all energy saving cells are calculated through the CRM, and $P_N$ represents power resources required by the used users. Moreover, idle power resources of all the energy saving cells are calculated through the CRM, that is, power resources that can be provided to the switch users. $P_C$ is used to represent the idle power resources in all the energy saving compensation cells. If the power resources $P_N$ required by the users are more than the idle resources $P_C$ of the energy saving compensation cells, not all the switch users can be accessed to the energy saving compensation cells. Therefore, it is necessary to reduce the number of the energy saving cells, that is to reduce the number of the switch users, until the power resources required by the switch users are less than the idle resources of the energy saving compensation cells, otherwise the number of the energy saving cells is gradually reduced. After the idle resources of the energy saving compensation cells are more than resources required by the switch users, the numbers of users of the user group 1 and the user group 2 are determined. If the number of users of the user group 1 is greater than that of the user group 2, the access situation of the user group 1 is analyzed first, otherwise, the access situation of the user group 2 is analyzed first.

If the number of users of the user group 1 is greater than that of the user group 2, whether the power resources required by the user group 1 are less than the idle power resources that can be provided by the cell 1 is judged. If the idle power resources that can be provided by the cell 1 are less than resources required by the user group 1, part of the users of the user group 1 are switched to the cell 1, and the remaining switch users that are not accessed are incorporated into the user group 3. Since the overall idle resources are more than the required resources, all the switch users of the user group 3 and the user group 2 can be accessed to the cell 2; and if the idle power resources that can be provided by the cell 1 are more than the resources required by the user group 1, all the users of the user group 1 are switched to the cell 1. At this moment, it is still necessary to judge whether the cell 1 has idle resources, if yes, part of the users of the user group 2 are switched to the cell 1, and if not, the cell 1 can serve the switch users of the user group 1 completely. Then, the remaining switch users are accessed to the cell 2.

If the number of users of the user group 2 is greater than that of the user group 1, whether the power resources required by the user group 2 are less than idle power resources that can be provided by the cell 2 is judged. If the idle power resources that can be provided by the cell 2 are more than the resources required by the user group 2, all the users of the user group 2 are switched to the cell 2. Then, whether the cell 2 has the remaining idle power resources is judged, if yes, part of the switch users of the user group 1 are accessed to the cell 2, and if not, the cell 2 can serve the switch users of the user group 2 completely. Subsequently, the remaining switch users of the user group 3 and the user group 1 are accessed to the cell 2. If the idle power resources that can be provided by the cell 2 are less than the resources required by the user group 2, part of the users of the user group 2 are switched to the cell 2, and the remaining switch users that are not accessed are incorporated into the user group 3. In a similar way, since the overall idle resources are more than the required resources, all the switch users of the user group 3 and the user group 1 can be accessed to the cell 1.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A group switching method under energy saving modes, characterized in that the method is applied in a mobile communication network, with a Centralized Resource Manager (CRM) managing the working state of each base station, and the method comprises preparing a preparation of user grouping and performing a group switching;

wherein the preparation of user grouping comprises:

a mobile communication system defining four business types of users: a session type, a stream type, an interaction type and a background type; and users distinguished according to different business types, and wherein four types of users are divided; the users are divided into two categories and specifically divided into three user groups according to requirements for a transmission rate; firstly, switch users of the session type and the stream type have certain requirements for the transmission rate, so the switch users of the two types are incorporated into the same category, which is named a category with high requirements for the transmission rate; the interaction type and the background type are incorporated into the other category, which is named a category with low requirements for the transmission rate; then, ⅔ of switch users are randomly divided from the category with high requirements for the transmission rate to constitute a user group 1, ⅔ of switch users are randomly divided from the category with low requirements for the transmission rate to constitute a user group 2, and the remaining switch users constitute a user group 3; the user groups are accessed to energy saving compensation cells by the grouping method; the energy saving compensation cells are divided into two categories according to user types in the cells: high transmission rate cell and low transmission rate cell; the low transmission rate cell means that users of the interaction type and the background type in the energy saving compensation cells are more than users of the other two types, which is expressed as a cell 1; and the high transmission rate cell means that users of the session type and the stream type in the energy saving compensation cells are more than users of the other two types, which is expressed as a cell 2;

wherein the group switching comprises:

power resources required by the switch users for services owned by the switch user in all energy saving cells are calculated through the centralized resource manager (CRM), and $P_N$ represents power resources required by the used users; moreover, idle power resources of all the energy saving cells are calculated through the CRM, that is, power resources that can be provided to the switch users; $P_C$ is used to represent the idle power resources in all the energy saving compensation cells; if the power resources $P_N$ required by the users are more than the idle resources $P_C$ of the energy saving compensation cells, not all the switch users can be accessed to the energy saving compensation cells;

a number of the energy saving cells is reduced, that is to reduce the number of the switch users, until the power resources required by the switch users are less than the idle resources of the energy saving compensation cells, otherwise the number of the energy saving cells is gradually reduced; after the idle resources of the energy saving compensation cells are more than resources required by the switch users, the numbers of users of the user group 1 and the user group 2 are determined; and if the number of users of the user group 1 is greater than that of the user group 2, an access situation of the user group 1 is analyzed first, otherwise, the access situation of the user group 2 is analyzed first;

in particular, when the cell enters the energy saving state, the Centralized Resource Manager (CRM) directs users to switch from the cell that has entered the energy saving state to the Neighbor base station.

2. The group switching method under energy saving modes of claim 1, characterized in that:

if the number of users of the user group 1 is greater than that of the user group 2, whether power resources required by the user group 1 are less than idle power resources that can be provided by the cell 1 is judged; if the idle power resources that can be provided by the cell 1 are less than resources required by the user group 1, part of the users of the user group 1 are switched to the cell 1, and the remaining switch users that are not accessed are incorporated into the user group 3;

all the switch users of the user group 3 and the user group 2 are accessed to the cell 2;

if the idle power resources that can be provided by the cell 1 are more than the resources required by the user group 1, all the users of the user group 1 are switched to the cell 1;

whether the cell 1 still has idle resources is judged, if the cell 1 still has idle resources, part of the users of the user group 2 are switched to the cell 1, and if the cell 1 still does not have idle resources, the cell 1 can serve switch users of the user group 1 completely, and the remaining switch users are accessed to the cell 2;

if the number of users of the user group 2 is greater than that of the user group 1, whether power resources required by the user group 2 are less than idle power resources that can be provided by the cell 2 is judged; if the idle power resources that can be provided by the cell 2 are more than resources required by the user group 2, all the users of the user group 2 are switched to the cell 2;

then, whether the cell 2 has the remaining idle power resources is judged, if the cell 2 has the remaining idle power resources, part of the switch users of the user group 1 are accessed to the cell 2, and if the cell 2 does not have the remaining idle power resources, the cell 2 can serve switch users of the user group 2 completely; the remaining switch users of the user group 3 and the user group 1 are accessed to the cell 2; if the idle power resources that can be provided by the cell 2 are less than the resources required by the user group 2, part of the users of the user group 2 are switched to the cell 2, and the remaining switch users that are not accessed are incorporated into the user group 3; and all the switch users of the user group 3 and the user group 1 are accessed to the cell 1;

thereby performing user handover, wherein the user handover is a process of a user switching from the cell in which the user entered the energy saving state to the cell corresponding to the neighbor base station.

* * * * *